No. 656,479.  G. W. SCHELLENBACH.  Patented Aug. 21, 1900.
TOOTH PICK.
(Application filed Mar. 14, 1900.)
(No Model.)
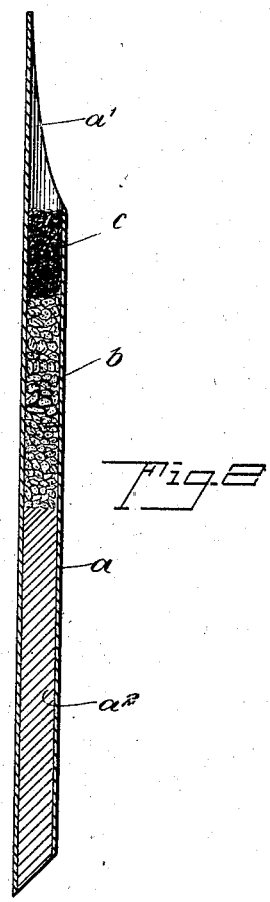
WITNESSES:
INVENTOR
G. W. Schellenbach
BY
ATTORNEYS

UNITED STATES PATENT OFFICE.

GEORGE W. SCHELLENBACH, OF JOPLIN, MISSOURI.

TOOTHPICK.

SPECIFICATION forming part of Letters Patent No. 656,479, dated August 21, 1900.

Application filed March 14, 1900. Serial No. 8,633. (No model.)

*To all whom it may concern:*

Be it known that I, GEORGE W. SCHELLENBACH, a citizen of the United States, and a resident of Joplin, in the county of Jasper and State of Missouri, have invented a new and Improved Toothpick, of which the following is a full, clear, and exact description.

This invention relates to a toothpick which is adapted to form a substitute for cigarettes, chewing-tobacco, &c. It is well known that a person is inclined to carry a toothpick in his mouth after eating, and by constructing a toothpick so that it will give a pleasant taste to the person using it I avoid the tendency in such person to smoke or chew after eating.

This invention is the disclosure of one form of my invention, while the claim defines the actual scope thereof.

Reference is to be had to the accompanying drawings, forming a part of this specification, in which similar characters of reference indicate corresponding parts in both views.

Figure 1 is a perspective view of the invention, and Fig. 2 is an enlarged longitudinal section thereof.

In carrying out my invention I provide a quill $a$, one end of which is furnished with the usual point $a'$, and the other end of which is left in its natural state—that is to say, with the pith $a^2$ therein. This may be substituted, if desired, by any suitable packing to close the quill at this end. Within the quill, next to the pith $a^2$, I place certain ingredients $b$, which are intended to impart a pleasant taste to the person using the toothpick. These ingredients may be, for example, gum-camphor, licorice-root, cinnamon-bark, and a small quantity of syrup, honey, or the like. The ingredients $b$ are held in the quill by a quantity of cotton wadding or other packing $c$, which is placed directly adjacent to the point $a'$. A person using this toothpick will upon moistening the cotton packing $c'$ draw from the ingredients $b$ their pleasant flavor and will thus enjoy the use of the toothpick to such an extent that it will furnish a substitute for the usual smoke or chew after eating.

Having thus described my invention, I claim as new and desire to secure by Letters Patent—

A toothpick, having a hollow tubular body such as a quill, one end of which is closed and the other end of which is formed with a point for engagement with the teeth, and a quantity of flavoring or medicinal substance or substances contained within the hollow body directly adjacent to the point, so that when using the toothpick on the teeth, the said flavoring or medicinal substances will be brought into use.

In testimony whereof I have signed my name to this specification in the presence of two subscribing witnesses.

GEORGE W. SCHELLENBACH.

Witnesses:
WALTER RANKIN,
W. L. GIBBS.